(12) United States Patent
Chen et al.

(10) Patent No.: US 12,280,459 B2
(45) Date of Patent: Apr. 22, 2025

(54) MULTI-DEGREE-OF-FREEDOM NUMERICAL CONTROL TURNTABLE

(71) Applicant: KEDE NUMERICAL CONTROL CO., LTD., Dalian (CN)

(72) Inventors: Hu Chen, Dalian (CN); Lixin Liu, Dalian (CN); Hongwei Sun, Dalian (CN); Zhihong Wei, Dalian (CN); Changlin Du, Dalian (CN); Cuijuan Guo, Dalian (CN); Guoshuai Zhang, Dalian (CN); Yapeng Li, Dalian (CN); Haibo Zhang, Dalian (CN); Xin Deng, Dalian (CN); Xiangyuan Kong, Dalian (CN); Qidong Guo, Dalian (CN); Gang Xu, Dalian (CN); Jun Wang, Dalian (CN); Feng Wang, Dalian (CN); Yinghua Li, Dalian (CN); Shaoyi Liu, Dalian (CN); Zidan Ju, Dalian (CN)

(73) Assignee: KEDE NUMERICAL CONTROL CO., LTD., Liaoning (CN)

( * ) Notice: Subject to any disclaimer, the term of this patent is extended or adjusted under 35 U.S.C. 154(b) by 403 days.

(21) Appl. No.: 17/779,071

(22) PCT Filed: Sep. 22, 2020

(86) PCT No.: PCT/CN2020/116910
§ 371 (c)(1),
(2) Date: May 23, 2022

(87) PCT Pub. No.: WO2021/135425
PCT Pub. Date: Jul. 8, 2021

(65) Prior Publication Data
US 2022/0395944 A1    Dec. 15, 2022

(30) Foreign Application Priority Data
Dec. 31, 2019  (CN) .......................... 201911419346.4

(51) Int. Cl.
*B23Q 1/25*       (2006.01)
*B23Q 1/54*       (2006.01)
(Continued)

(52) U.S. Cl.
CPC ............. *B23Q 1/25* (2013.01); *B23Q 1/5406* (2013.01); *B23Q 1/5425* (2013.01);
(Continued)

(58) Field of Classification Search
CPC .. B23Q 1/25; B23Q 1/5437; B23Q 2220/004; B23Q 5/28; B23Q 15/12; B23Q 1/4809;
(Continued)

(56) References Cited

U.S. PATENT DOCUMENTS

2014/0035216 A1*  2/2014  Lu ........................... B23Q 3/02
                                                                    269/309
2019/0030666 A1*  1/2019  Haueter ............... B23Q 1/5443
(Continued)

FOREIGN PATENT DOCUMENTS

CN        101386150 A       3/2009
CN        102310354 A   *   1/2012
(Continued)

OTHER PUBLICATIONS

A Numerical Control Processing Machine Tool and Its Rotating Table; Patent No. 103084854; Document ID:CN 103084854 A; Date Published: May 8, 2013; Inventor: Lin, Tian-wei; Date Filed: Jan. 24, 2013 (Year: 2013).*

*Primary Examiner* — Mahdi H Nejad
(74) *Attorney, Agent, or Firm* — MUNCY, GEISSLER, OLDS & LOWE, P.C.

(57) ABSTRACT

The present invention discloses a multi-degree-of-freedom numerical control turntable including: a B-shaft rotating assembly; a C1-shaft workbench swing assembly; a C2-shaft workbench rotating assembly; and an S-shaft workbench
(Continued)

movement assembly. The B-shaft rotating assembly includes a rotating connection land and a B-shaft power control mechanism; the C2-shaft workbench rotating assembly includes a movement base, a workbench and a C2-shaft power control mechanism; the S-shaft workbench movement assembly includes a swing base and an S-shaft power control mechanism; and the C1-shaft workbench swing assembly includes a swing arm and a C1-shaft power control mechanism, with the C1-shaft line intersecting the B-shaft line. The S-shaft power control mechanism can drive the movement base to move along an S-shaft line on the swing base to cause a region to be machined of a workpiece to approach the intersection point of the C1-shaft line and the B-shaft line. The present invention adds the C1-shaft and S-shaft, so that when the cutting edge point participates in the motion, the coordinate change of the linear shaft is smaller, the compensation range of the linear shaft is smaller, the machining efficiency is higher, and the surface quality and machining accuracy are less affected by the accuracy of the linear shaft.

7 Claims, 1 Drawing Sheet

(51) Int. Cl.
*B23Q 5/28* (2006.01)
*B23Q 15/12* (2006.01)

(52) U.S. Cl.
CPC ............. *B23Q 1/5437* (2013.01); *B23Q 5/28* (2013.01); *B23Q 15/12* (2013.01)

(58) Field of Classification Search
CPC .. B23Q 1/5425; B23Q 2210/006; B23Q 5/22; B23Q 1/5406; B23Q 1/015; B23Q 1/525
USPC ............... 269/61, 71, 63; 409/168, 201, 224
See application file for complete search history.

(56) References Cited

U.S. PATENT DOCUMENTS

| | | | | |
|---|---|---|---|---|
| 2023/0010236 A1* | 1/2023 | Matsushita | ............ | B23Q 15/12 |
| 2023/0010557 A1* | 1/2023 | Matsushita | ............ | B23Q 15/12 |
| 2023/0055452 A1* | 2/2023 | Chen | ...................... | B23Q 3/183 |

FOREIGN PATENT DOCUMENTS

| | | | | | |
|---|---|---|---|---|---|
| CN | 103084854 | A | | 5/2013 | |
| CN | 104669091 | A | | 6/2015 | |
| CN | 206825077 | U | | 1/2018 | |
| CN | 111055135 | A | | 4/2020 | |
| CN | 211728297 | U | | 10/2020 | |
| DE | 10259215 | A1 | | 7/2004 | |
| DE | 102015005557 | A1 | * | 11/2016 | ............. B23Q 1/01 |
| DE | 202017106229 | U1 | * | 2/2019 | ............. B23Q 1/525 |
| WO | WO-2021043404 | A1 | * | 3/2021 | ............. B23Q 1/015 |

* cited by examiner

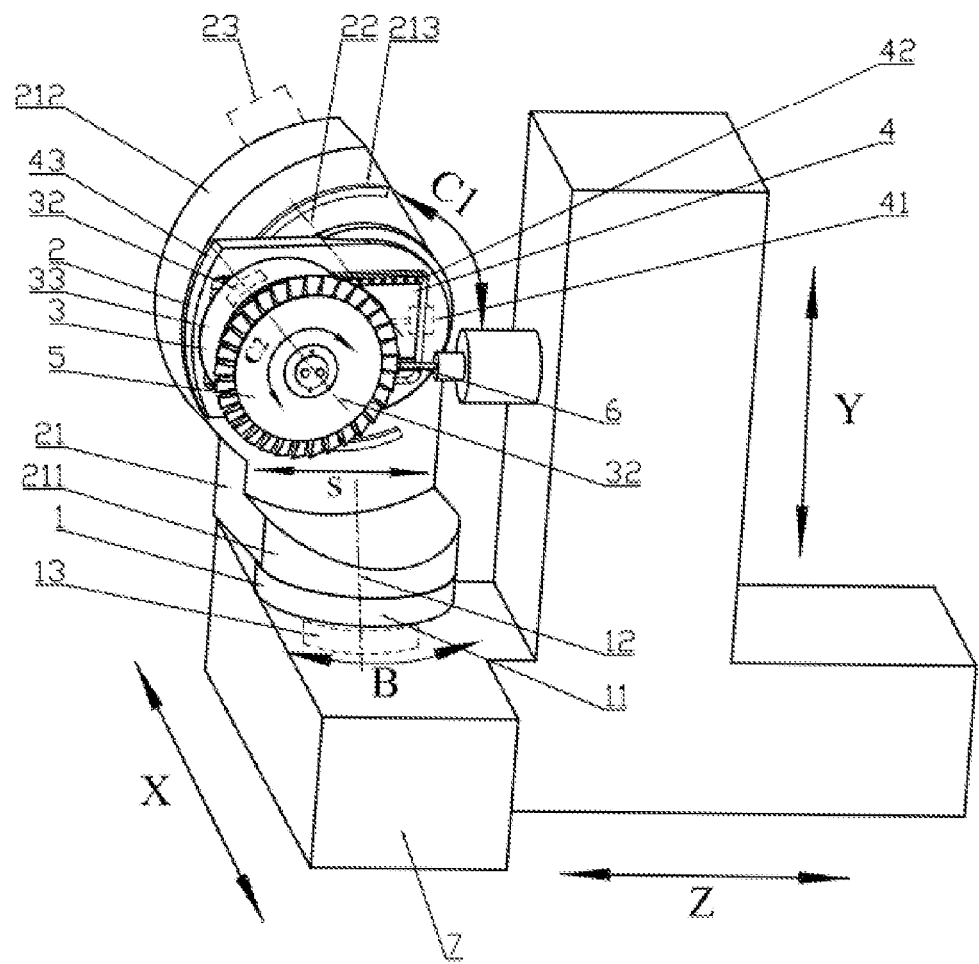

MULTI-DEGREE-OF-FREEDOM NUMERICAL CONTROL TURNTABLE

TECHNICAL FIELD

The present invention relates to the technical field of machine tool, specifically, to a multi-degree-of-freedom numerical control turntable.

BACKGROUND ART

At present, blisk part is a kind of common important part in the fields of aerospace, ships, automobile engines, etc., and is one of the main components of rocket engines, aircraft engines, etc. Such a kind of part has complicated helicoid surfaces and has high requirements for machining accuracy and machining efficiency. Machine tools such as high-end five-axis machining centers are usually used to machine blisk parts, and this type of high-end five-axis machining center is usually a cradle-type two-axis turntable of a rotating shaft structure. The cradle-type turntable is usually arranged horizontally, and the workbench is horizontal when the cradle is placed at 0 degree. In an equipment for machining common blisk parts, such as common turntables including two-axis turntable of AC axes, two-axis turntable of BC axes, single-axis turntable, etc., the relative positions of the control points of the shaft system are fixed. And in clamping the common blisk parts, the workpiece axis needs to be coincident with the rotating shaft axis, while the region to be machined will have a large distance from the controlling rotating shaft line. When machining a blisk having a large diameter, using a five-axis machining center with a horizontal workbench will cause the cutting edge point position to be too far from the controlling shaft system. When performing the RTCP motion of the machine tool, the position compensation value of the linear shaft will be increased, and thus, the efficiency and machined surface quality will be affected greatly. In addition to the defects in control, in terms of structure, the turntable swing arm is placed horizontally when machining blisk parts of larger diameter, and that puts forward higher requirements for the power of the entire swing arm rotating shaft, causing the structure size to be larger, the machine tool model to be larger, the turntable interference space to be larger, and the overall product cost to be higher.

SUMMARY OF INVENTION

In view of the above problems, a multi-degree-of-freedom numerical control turntable is researched and designed in the present invention. The technical solution adopted in the present invention is as follows:

The multi-degree-of-freedom numerical control turntable includes: a B-shaft rotating assembly; a C1-shaft workbench swing assembly; a C2-shaft workbench rotating assembly; and an S-shaft workbench movement assembly. The B-shaft rotating assembly includes a rotating connection land and a B-shaft power control mechanism for driving the rotating connection land to rotate around a B-shaft line; the C2-shaft workbench rotating assembly includes a movement base, a workbench and a C2-shaft power control mechanism for driving the workbench to rotate around a C2-shaft line on the movement base; the S-shaft workbench movement assembly includes a swing base and an S-shaft power control mechanism; and the C1-shaft workbench swing assembly includes a swing arm and a C1-shaft power control mechanism for driving the swing base to swing around a C1-shaft line on the swing arm, with the swing arm fixed on the rotating connection land and the C1-shaft line intersecting the B-shaft line. The S-shaft power control mechanism can drive the movement base to move along an S-shaft line on the swing base to cause a region to be machined of a workpiece to approach the intersection point of the C1-shaft line and the B-shaft line.

Further, the S-shaft line is perpendicular to the C1-shaft line.

Further, the C1-shaft line and the B-shaft line are perpendicular to each other and the B-shaft, the C1-shaft and a linear shaft of a machine tool jointly perform a five-axis RTCP motion.

Further, the S-shaft workbench movement assembly includes an S-shaft rail disposed on the swing base and the S-shaft power control mechanism can drive the movement base to move on the S-shaft rail.

Further, the B-shaft rotating assembly is mounted on an X-axis motion base of the machine tool; the B-shaft is perpendicular to the X-axis and Z-axis of the machine tool; the swing arm includes a swing arm base and a sector swing arm; the sector swing arm and the swing arm base are connected to form an L-shaped structure; the swing arm base is fixed on the rotating connection land; the sector surface of the sector swing arm is provided with a C1-shaft arcuate rail for supporting the swing base in an auxiliary manner; the sector surface of the sector swing arm is parallel to the B-shaft line; and the table top of the workbench is parallel to the B-shaft line.

Further, the B-shaft line is a vertical shaft line; the sector surface of the sector swing arm is a vertical surface; the C1-shaft line and C2-shaft line are both horizontal shaft lines; and the table top of the workbench is a vertical surface.

Further, an arc portion of the sector swing arm faces a side away from a cutting tool.

Further, the B-shaft power control mechanism and the C2-shaft power control mechanism are power mechanisms directly driven by a torque motor; the C1-shaft power control mechanism is a servo motor matched with a double-gear backlash eliminating structure; and the S-shaft power control mechanism is a servo motor screw rod mechanism.

Compared with the prior art, the multi-degree-of-freedom numerical control turntable of the present invention has the following advantages:

1. the present invention changes the form of the two-axis turntable used by the traditional five-axis machining center, adopts the joint control of four shaft systems, selects the C1-shaft and the B-shaft as the shaft system for executing the RTCP motion, and adds the C1-shaft and the S-shaft such that: the cutting edge point of the cutting tool can be as close as possible to the shaft line participating in the execution of the RTCP motion during rotary machining and the cutting edge point position is as close as possible to or coincident with the five-axis controlling shaft so that when the cutting edge point position participates in the motion, the coordinate change of the linear shaft is smaller, the compensation range of the linear shaft is smaller, the machining efficiency is higher, and the surface quality and machining accuracy are less affected by the accuracy of the linear shaft;
2. by adjusting the position of the parts via the shaft system, parts of larger size can be machined in a limited machine tool space, thereby, the present invention can reduce the equipment cost while ensuring the machining accuracy of parts of larger size, and is more suitable for the characteristics of blisk parts having complex curved surfaces, and thus satisfies production needs;

3. compared with the traditional horizontal turntable structure, the vertical turntable structure is more suitable for the machining of parts having complex curved surfaces such as blisks, and by being matched with the horizontal machining center, it can machine blisks of various metal materials such as superalloy and stainless steel, and can complete turning, milling, drilling, boring, tapping and other machining in one clamping.

BRIEF DESCRIPTION OF DRAWINGS

The sole FIGURE is a schematic structural diagram of an embodiment of the present invention.
In the FIGURE:
1. B-shaft rotating assembly, 11. rotating connection land, 12. B-shaft line, 13. B-shaft power control mechanism;
2. C1-shaft workbench swing assembly, 21. swing arm, 211. swing arm base, 212. sector swing arm, 213. arcuate rail, 22. C1-shaft line, 23. C1-shaft power control mechanism;
3. C2-shaft workbench rotating assembly, 31. C2-shaft line, 32. C2-shaft power control mechanism, 33. movement base;
4. S-shaft workbench movement assembly, 41. S-shaft power control mechanism, 42. S-shaft rail, 43. swing base;
5. workpiece; 6. cutting tool; 7. bed;
X. X-axis direction; Y. Y-axis direction; Z. Z-axis direction; B. B-shaft rotating direction; C1. C1-shaft swing direction; C2. C2-shaft rotating direction; S. S-shaft direction.

DESCRIPTION OF EMBODIMENTS

As shown in the sole FIGURE, a multi-degree-of-freedom numerical control turntable includes a B-shaft rotating assembly 1, a C1-shaft workbench swing assembly 2, a C2-shaft workbench rotating assembly 3 and an S-shaft workbench movement assembly 4. The B-shaft rotating assembly 1 includes a rotating connection land 11 and a B-shaft power control mechanism 13 for rotating the rotating connection land 11 around the B-shaft line 12; the C2-shaft workbench rotating assembly 3 includes a movement base 33, a workbench and a C2-shaft power control mechanism 32 for driving the workbench to rotate around the C2-shaft line 31 on the movement base 33; the S-shaft workbench movement assembly 4 includes a swing base 43 and an S-shaft power control mechanism 41 for driving the workbench to move along the S-shaft line on the swing base 43; the C1-shaft workbench swing assembly 2 includes a swing arm 21 and a C1-shaft power control mechanism 23 for driving the swing base 43 to swing on the swing arm 21 around the C1-shaft line 22, with the C1-shaft line 22 intersecting the B-shaft line 12; and the S-shaft power control mechanism 41 can drive the movement base 33 to move along the S-shaft line on the swing base 43, causing the region to be machined of the workpiece to approach the intersection point of the C1-shaft line and the B-shaft line, wherein the S-shaft line is the shaft line in the 5-shaft direction. The numerical control machine tool is connected to the swing arm 21 via the B-shaft rotating assembly 1, and the workpiece to be machined (the blisk 5 in this embodiment) is clamped on the workbench on the movement base 33. Specifically, the B-shaft, C1-shaft and linear shaft of machine tool jointly perform the five-axis RTCP (Rotation Tool Center Point) motion; the C1-shaft is a workbench swing rotating shaft system, the B-shaft is the controlling shaft system for the rotary motion of each component of the whole vertical part, the C2-shaft is a workbench rotary motion shaft system, the S-shaft indicates the movement position of the workbench and is used for adjusting the position of the workbench relative to the C1-shaft line and the B-shaft line so that the cutting edge point position is as close as possible to or coincident with the shaft line participating in the execution of the RTCP motion, and thus, when the shaft line participates in the motion, the coordinate change of the linear shaft is smaller, the compensation range of the linear shaft is smaller, the machining efficiency is higher, and the surface quality and machining accuracy are less affected by the accuracy of the linear shaft. By adjusting the position of the parts via the shaft system, parts of larger size can be machined in a limited machine tool space, thereby, the present invention can reduce the equipment cost while ensuring the machining accuracy of parts of larger size, and is more suitable for the characteristics of blisk parts having complex curved surfaces, and thus satisfies production needs.

As a preferred solution, the S-shaft line is perpendicular to the plane where the C1-shaft line 22 and the B-shaft line 12 are located, and the C1-shaft line 22 and the B-shaft line 12 are perpendicular to each other.

An S-shaft rail 42 is provided on the swing base 43, the C2-shaft workbench rotating assembly 3 is connected to the swing base 43 through the S-shaft rail 42 and is connected to the S-shaft power control mechanism 41, and the blisk 5, C2-shaft workbench rotating assembly 3, S-shaft rail 42 and S-shaft power control mechanism 41 are all mounted on the swing base 43. The C2-shaft workbench rotating assembly 3 drives the blisk 5 to perform 360° rotary indexing through the C2-shaft power control mechanism 32. The C2-shaft workbench rotating assembly 3 which clamps the blisk 5 can move along the shaft direction through the S-shaft power control mechanism 41 in the direction of the S-shaft rail 42.

The B-shaft line 12 is a vertical shaft line, the S-shaft line, C1-shaft line 22 and C2-shaft line 31 are horizontal shaft lines, and the swing arm 21 includes a swing arm base 211 and a sector swing arm 212 fixed on the swing arm base 211, the sector swing arm 212 and the swing arm base 211 are connected to form an integral L-shaped structure, the swing arm base 211 is fixed on the rotating connection land 11, the B-shaft power control mechanism 13 drives the swing arm base 211 to rotate, a C1-shaft arcuate rail 213 for supporting the swing base 43 in an auxiliary manner is provided on the sector surface of the sector swing arm 212 so that the swing base 43 can swing along the sector profile of the sector swing arm 212. When machining blisks of large diameter, the vertical swing arm structure reduces the interference space, reduces the angle rotation limit, shortens the width of the turntable, reduces the power control requirements of the rotating shaft, reduces the width of the applied machine tool, and reduces the cost of the machine tool, and the sector swing arm 212 further reduces the interference space. In this embodiment, the arc portion of the sector swing arm 212 faces the side away from the cutting tool 6, the B-shaft line 12 is parallel to the sector surface of the sector swing arm 212, and the sector surface of the sector swing arm 212 is parallel to the B-shaft line 12, i.e., the B-shaft line 12 is the rotation center of the swing arm base 211, and there is a distance between the B-shaft line 12 and the sector swing arm 212, which can be set at the edge of the swing arm base 211 so that when the workpiece is mounted on the workbench, the region to be machined of the workpiece can reach the corresponding position of the B-shaft line 12.

In this embodiment, the B-shaft rotating assembly is mounted on the X-axis motion base of the machine tool, the B-shaft line is perpendicular to the X and Z axes of the machine tool, and the B-shaft line is parallel to the Y-axis of the machine tool. Specifically, the B-shaft line 12 is a vertical shaft line, the sector surface of the sector swing arm 212 is a vertical surface, the C1-shaft line 22 and C2-shaft line 31 are both horizontal shaft lines, and the table top of the workbench is a vertical surface.

In the B-shaft power control mechanism 13 and C2-shaft power control mechanism 32, the torque motor directly drives the power mechanisms to be matched with the encoder (the power mechanism can also be in the form of mechanical turbine worm, roller cam, etc.) to achieve the advantages of high accuracy, high stability, compact mechanical structure, etc. In the power mechanism of the swing motion of the swing shaft, since the swing shaft needs to drive a large weight, considering its large moment of inertia of rotation, the C1-shaft power control mechanism 23 is in the form of a servo motor matched with a double-gear backlash eliminating structure and an encoder (the power mechanism can also be in the form of a direct drive motor, connecting rod mechanism, screw rod, etc.). The use of servo motor and double-gear anti-backlash structure can reduce the size of space while outputting a large torque to ensure the operation of the swing shaft. In this embodiment, the C1-shaft power control mechanism 23 is disposed on the sector swing arm, and the C1-shaft power control mechanism 23 and the swing base 43 are located on the back and front of the sector swing arm 212, respectively; the S-shaft power control mechanism 41 is in the form of a servo motor screw rod and an encoder (the power mechanism can also be in the form of a hydraulic cylinder, an electric cylinder, a linear electric motor, etc.), making full use of the advantages of the self-locking and high rigidity of the servo motor screw rod to achieve precise stroke control. The torque motor direct drive power mechanism, the servo motor matched with double-gear anti-backlash structure and the structural principle of the servo motor screw rod mechanism itself are all in the prior art, and will not be repeated here.

In the five-axis machining center, this embodiment adopts the X-axis, Y-axis, Z-axis, B-shaft and C1-shaft to jointly execute the five-axis RTCP motion, the C1-shaft can perform a swing control to drive the workbench to swing around the C1-shaft line 22, the C2-shaft is used as the workbench indexing shaft, the S-shaft is used as the workbench position adjustment shaft, and the position of workbench relative to the C1-shaft line 22 can be adjusted. In this embodiment, when the workpiece is machined, the region to be machined of the workpiece is made as close as possible to or overlapped with the C1-shaft line 22 and the B-shaft line 12. For example, the outer edges of the blisk, which is the workpiece to be machined, are complex curved surfaces. By adjusting the position of the C2-shaft workbench rotating assembly 3 and adjusting the clamping height of the blisk, the outer edge region to be machined is made as close as possible to or overlapped with the C1-shaft line 22 and the B-shaft line 12 during machining, so that the cutting edge point of the cutting tool can be as close as possible to the C1-shaft line 22 and B-shaft line 12 participating in the execution of the five-axis RTCP motion during machining. In this embodiment, the C1-shaft line 22 and the B-shaft line 12 are coplanar. When the RTCP motion is executed, the numerical control system compensates very little for the shaft system deviation, thus improves the machining accuracy.

The above-mentioned embodiments merely describe the preferred embodiments of the present invention, and do not limit the scope of the present invention. Without departing from the design spirit of the present invention, various modifications and improvements made by a person skilled in the art on the technical solution of the present invention shall fall within the protection scope determined by the claims of the present invention.

The invention claimed is:

1. A multi-degree-of-freedom numerical control turntable, comprising:
  a B-shaft rotating assembly that includes a rotating connection land and a B-shaft power control mechanism for driving the rotating connection land to rotate around a B-shaft line;
  a C2-shaft workbench rotating assembly that includes a movement base, a workbench and a C2-shaft power control mechanism for driving the workbench to rotate around a C2-shaft line on the movement base;
  an S-shaft workbench movement assembly that includes a swing base and an S-shaft power control mechanism; and
  a C1-shaft workbench swing assembly that includes a swing arm and a C1-shaft power control mechanism for driving the swing base to swing around a C1-shaft line on the swing arm, with the swing arm fixed on the rotating connection land and the C1-shaft line intersecting the B-shaft line,
  wherein the S-shaft power control mechanism can drive the movement base to move along an S-shaft line on the swing base to cause a region to be machined of a workpiece to approach the intersection point of the C1-shaft line and the B-shaft line;
  wherein the B-shaft rotating assembly is mounted on an X-axis motion base of a machine tool; the B-shaft line is perpendicular to the X-axis and Z-axis of the machine tool; the swing arm includes a swing arm base and a sector swing arm; the sector swing arm and the swing arm base are connected to form an L-shaped structure; the swing arm base is fixed on the rotating connection land; a sector surface of the sector swing arm is provided with a C1-shaft arcuate rail for supporting the swing base in an auxiliary manner; the sector surface of the sector swing arm is parallel to the B-shaft line; and a table top of the workbench is parallel to the B-shaft line.

2. The multi-degree-of-freedom numerical control turntable according to claim 1, wherein the S-shaft line is perpendicular to the C1-shaft line.

3. The multi-degree-of-freedom numerical control turntable according to claim 1, wherein the C1-shaft line and the B-shaft line are perpendicular to each other and the B-shaft rotating assembly, the C1-shaft workbench swing assembly, the S-shaft workbench movement assembly and the C2-shaft workbench rotating assembly and a linear shaft of a machine tool jointly perform a five-axis RTCP motion.

4. The multi-degree-of-freedom numerical control turntable according to claim 1, wherein the S-shaft workbench movement assembly includes an S-shaft rail disposed on the swing base and the S-shaft power control mechanism can drive the movement base to move on the S-shaft rail.

5. The multi-degree-of-freedom numerical control turntable according to claim 1, wherein: the B-shaft line is a vertical shaft line; the sector surface of the sector swing arm is a vertical surface; the C1-shaft line and C2-shaft line are both horizontal shaft lines; and the table top of the workbench is a vertical surface.

6. The multi-degree-of-freedom numerical control turntable according to claim 5, wherein: an arc portion of the sector swing arm faces a side away from a cutting tool.

7. The multi-degree-of-freedom numerical control turntable according to claim 6, wherein: the B-shaft power control mechanism and the C2-shaft power control mechanism are power mechanisms directly driven by a torque motor; the C1-shaft power control mechanism is a servo motor matched with a double-gear backlash eliminating structure; and the S-shaft power control mechanism is a servo motor screw rod mechanism.

* * * * *